Aug. 9, 1966 V. Z. SMITH 3,265,900

TAPE READER WITH INPUT CLIPPING CIRCUIT INCLUDING PHOTOSENSITIVE MEANS

Filed Dec. 3, 1962 2 Sheets-Sheet 1

Inventor:
Vernon Z. Smith
By: James J. Jennings, Jr. Atty

Aug. 9, 1966 V. Z. SMITH 3,265,900

TAPE READER WITH INPUT CLIPPING CIRCUIT INCLUDING PHOTOSENSITIVE MEANS

Filed Dec. 3, 1962 2 Sheets-Sheet 2

Inventor:
Vernon Z. Smith
By: James J. Jennings, Jr. Atty.

United States Patent Office 3,265,900

Patented August 9, 1966

3,265,900

TAPE READER WITH INPUT CLIPPING CIRCUIT INCLUDING PHOTOSENSITIVE MEANS

Vernon Z. Smith, Wayne, Pa., assignor, by mesne assignments, to Borg-Warner Corporation, Chicago, Ill., a corporation of Illinois Filed Dec. 3, 1962, Ser. No. 242,341
7 Claims. (Cl. 250—214)

This invention is directed to a system for both detecting a change in a characteristic of an input signal to the system and for discriminating between information-denoting changes and random signal aberrations having no information content. In one environment, the invention affords a positive and accurate, while still economical, system for a photoelectric reader which assimilates information from a wide variety of tapes (e.g., printed, punched, chadless) even though the tape is scanned at a very high speed.

In the photoelectric reading art, it is desirable to "read" or detect information appearing on the different varieties of tape noted above. In certain systems such as that disclosed and claimed in Patent No. 3,124,675 of Herman Epstein entitled "Photoelectric Tape Reader," issued March 10, 1964, and assigned to the assignee of this invention, such detection has been accomplished by utilizing a specific light defining means, or light pipe, to channel the light from a specific location adjacent the tape to a detection circuit. In such system, a scanning disc is interposed between the light pipes and the detection means, and spaced-apart transparent bands are provided on the disc and separated by opaque areas. Accordingly variations in light level translated through the pipes provide a light signal which, in effect, is utilized to modulate a second or carrier signal of a frequency which is a joint function of the rotational speed of the disc and the spacing between the transparent bands on the disc. While this system is an accurate and fast-operating means for removing the information from different tapes, it is still desirable to improve system operation and to optimize system production and costs by, if possible, producing a reader which can operate effectively without light pipes and/or a scanning disc.

It is therefore a primary object of the present invention to provide a photoelectric reader which is simple and economical to fabricate, and uses components of average cost and quality.

It is another object of the invention to provide such a reader without the necessity of incorporating individual light defining means or pipes for each channel on the tape, and without rapidly moving parts such as a chopper disc.

It is a more specific object of the invention to provide such a reader which not only detects any change in the level of the input signal, but also accurately discriminates between information-denoting variations in the input signal and random aberrations of the signal which do not have any information content.

The foregoing and other objects of the invention are realized, in one embodiment, by providing a system in which at least one characteristic of the input signal varies from a reference value to a second value to denote a change in the information content. However, certain input signals have a random or noise-type aberration in the reference value of an amplitude at least equal to the extent of the variation between the reference value and the second value. Accordingly the system is provided with a first circuit means for determining whether a change in the input signal is only an aberration in the reference value or is a variation from the reference value to the second value. If the change is an information-denoting variation, a control signal is passed to a second circuit means, which in turn examines the control signal and produces an output signal only when the amplitude of the control signal indicates that the change in the input signal was in fact an information-denoting variation.

In order to acquaint those skilled in the art with the best mode contemplated for making and using the invention, a description thereof will be set forth in conjunction with the accompanying drawings, in the several figures of which like reference numerals identify like elements, and in which:

FIGURE 5 is a partial schematic diagram useful in explaining the operation of a portion of the circuitry depicted in FIGURE 3.

INTRODUCTION

Figure 1:
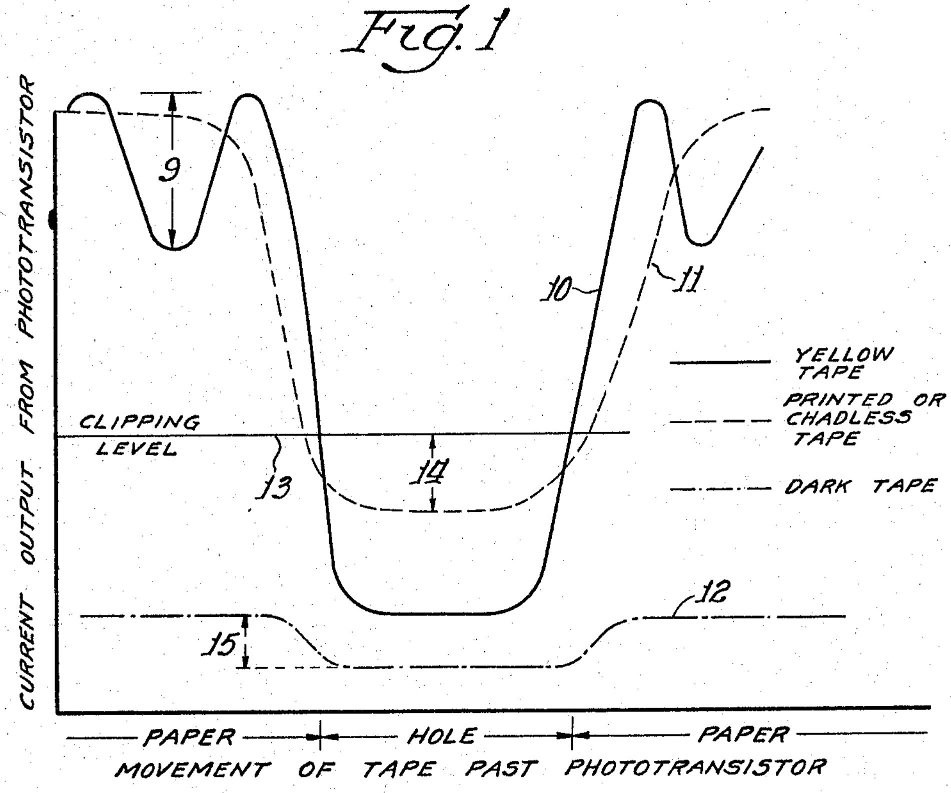
FIGURE 1 is a graphical illustration useful in understanding operation of the invention.

FIGURE 1 depicts not only certain of the operating characteristics of the invention, but further illustrates characteristics of the light level reflected from different tapes which are useful in understanding the problems of this art which are so efficiently, economically and accurately solved by this invention. The abscissa depicts movement of tape past the phototransistor or scanning element, and the ordinate indicates the variation in current or signal output from the semiconductor as a hole, blackened area, or other information-denoting portion of the tape is displaced past the scanning point to cause a reduction in the amount of light striking the phototransistor. The term "hole" as used in FIGURE 1 and in this explanation is considered generic not only to a definite aperture in the tape but also to a blackened area and to a chad or punched area which passes beneath or adjacent the scanning point.

Reference numeral 10 designates the curve which represents the signal level detected with a yellow tape, and under certain operating conditions the no-hole signal level may be of the order of 50 microamperes (microamps), varying from approximately 40 to 60 microamps, and this signal level may decrease to only about one-half microamp as the hole passes beneath the semiconductor scanning means. Thus the reference level of this signal is about 50 microamps, and this value changes to a second value of 0.5 microamp as a variation in the information content on the tape is detected. Even when no information change is detected, there is an undesired signal aberration of about 20 microamps, as represented by interval 9 in the drawing.

The broken-line curve 11 designates the variation in signal level when printed or chadless tape is utilized, and it has been found that the signal variation in this case may approximate a change from about 40 microamps with solid paper to a level of about 10 microamps as a hole passes beneath the scanning point. The curve designated 12 represents the signal variation when a black or dark background punched tape is utilized, and the signal level here may be approximately 4 microamps with solid paper and may decrease to about 0.2 microamp as a hole passes the scanning point. Accordingly it is evident that a mere detection of the change in the ratio of conduction between the no-hole and the hole conditions cannot be utilized to indicate information changes, in that the signal aberration of the yellow tape reference value is substantial, being considerably greater than the variation noted with the dark tape when a hole passes the scanning point. Further, a simple D.-C. clipping system cannot be utilized by itself, in that the signal level from the dark tape, even under no-hole conditions, is considerably less than the lowest signal value realized from the printed and chadless tapes when a hole passes the scanning point. These conflicting operating conditions appear contradictory and not readily admissible of a straightforward circuit solution.

In accordance with the inventive concept, a light-sensitive or radiation sensitive semiconductor means is positioned to provide an electrical signal responsive to the incidence of energy in the visible portion of the spectrum on the semiconductor. Those skilled in the art will appreciate the efficacy of the invention in discriminating between unwanted aberrations or noise and information-denoting signal variations, irrespective of the origin of the signal. A first circuit means is coupled to, and cooperates with, the semiconductor means to establish a clipping level approximately at the amplitude referenced by numeral 13 in FIGURE 1. The clipping level is set so that the "worst hole" signal is accommodated, that is, the signal variation which decreases to a second value which is highest on the ordinate scale (in the illustrated case the printed or chadless tape provides a maximum signal when a hole passes the scanning point) is below clipping level 13 by an extent indicated by numeral 14. The difference in amplitudes designated by numeral 14 is important in its relation to the amplitude difference referenced by numeral 15, which identifies the signal variation between the hole and the no-hole conditions for dark tape. The dark tape signal variation represents the "worst difference" condition, in that the least absolute change in signal levels is realized to signify the difference between the hole and no-hole conditions. In accordance with the inventive teaching, by (1) providing "difference detection" for a signal change at least equal to the extent represented by numeral 15, and (2) setting the D.-C. clipping level 13 so that the interval 14 is always equal to or greater than the interval represented by numeral 15, positive and accurate signal detection is obtained to represent the passage of holes or darkened areas past the scanning point.

Figure 2:
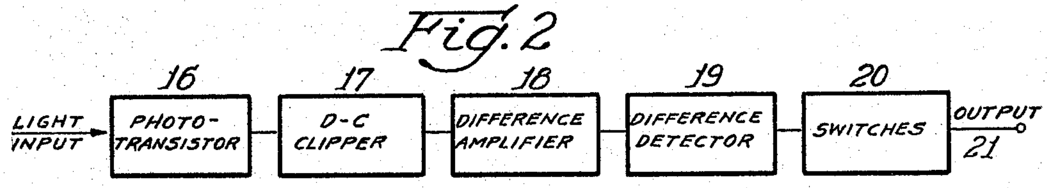
FIGURE 2 is a block diagram depicting certain major components of the invention in simplified form.
Figure 2:
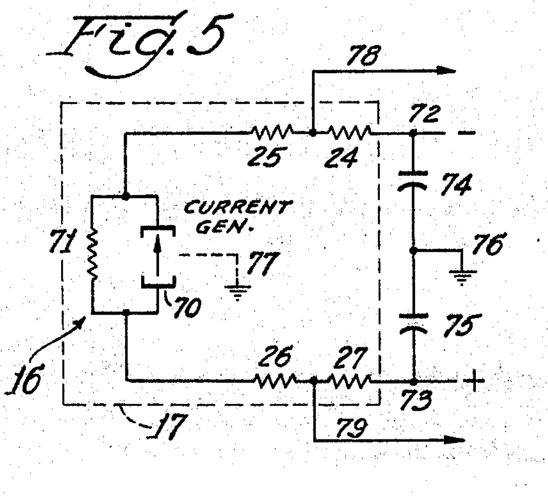

FIGURE 2 shows, in simplified form, a system for attaining the objects of the invention. A phototransistor 16 is provided in order to produce a useable variation in signal output as the level of light incident on the phototransistor changes to signal passage of a hole. Although sometimes characterized as a photodiode, the semiconductor means utilized in one embodiment (specific examples will be set out hereinafter) was actually a three-element semiconductor, even though only two electrical connections are provided. Essentially the base region has the generation of minority carriers regulated by the level of light incident thereon, in a manner analogous to the regulation of the carriers by the application of a voltage to the base in a conventional three-terminal transistor. A D.-C. clipping stage 17 is coupled to the phototransistor. As will become apparent from the explanation given hereinafter, D.-C. clipping stage 17 interacts with the phototransistor to provide clipping at a level such as that indicated by numeral 13 in FIGURE 1, providing a control signal output whenever the input signal falls below the level referenced by numeral 13.

A difference amplifier is coupled to the output side of D.-C. clipping stage 17, and a difference detector stage 19 is coupled to the output side of the difference amplifier. The difference detector is adjusted to provide an output signal responsive to the application to its input side of a control signal having at least an amplitude such as that referenced by interval 15 in FIGURE 1. Although not essential for the operation of this novel system, one or more switches 20 are coupled between difference detector 19 and output terminal 21 to enhance the level of the output signal and provide for positive operation of associated equipment.

Before considering the structure of the invention in more detail, it is again emphasized that the invention is concerned not only with structural improvements but also with optimizing of cost factors and the production of a reliable circuit which will operate even when average-cost germanium transistors are utilized. Further, the ever present dilemma of choosing between gain and stability in the overall circuit, two characteristics which normally are mutually opposing, is resolved by the unobvious system of the invention which attains maximum practical levels of both gain and stability without sacrificing the economy or sureness of operation.

STRUCTURE OF THE INVENTION

Figure 3:
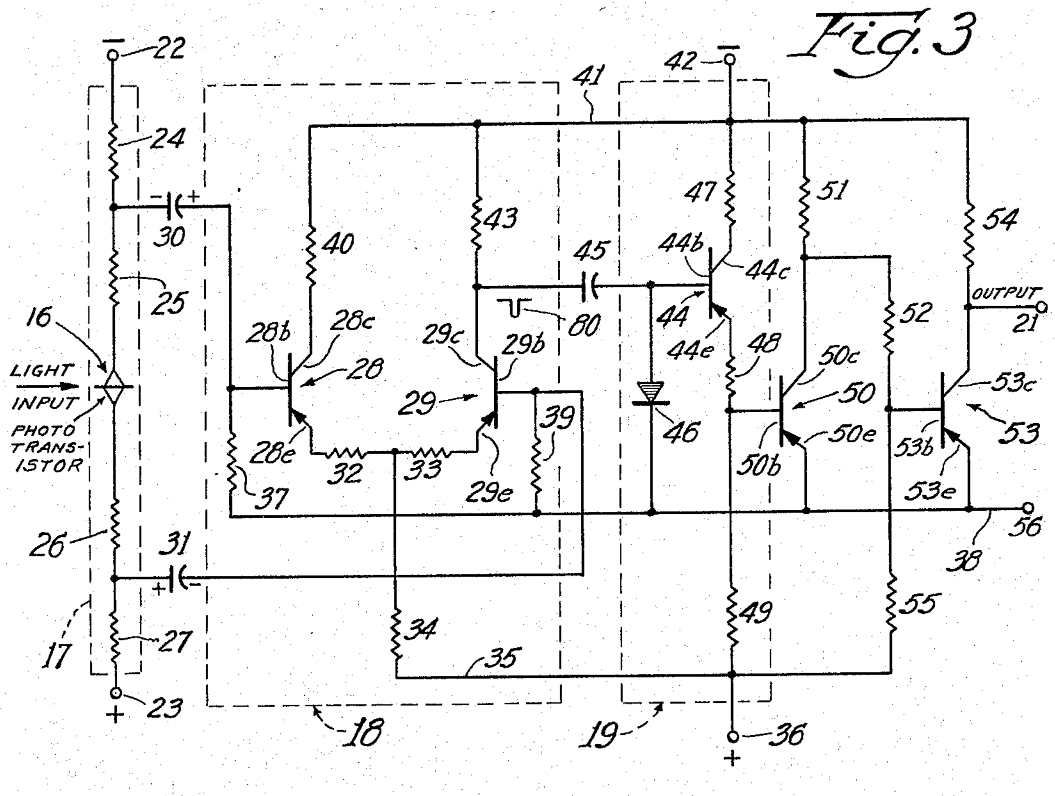
FIGURE 3 is a schematic diagram illustrating in more detail the inventive structure depicted generally in FIGURE 2.

In FIGURE 3, D.-C. clipping stage 17 is shown coupled between a first supply terminal 22 and a second supply terminal 23, to which suitable energizing potentials are applied as will be described hereinafter. Coupled in series between terminals 22 and 23 are a first resistance 24, a second resistance 25, semiconductor 16, a third resistor 26, and a fourth resistor 27. Difference amplifier 18 comprises a pair of transistors 28 and 29, each of which includes an emitter identified by *e* (e.g., 28*e* identifies the emitter of transistor 28), a base element referenced *b* and a collector designated *c*. Those skilled in the art will recognize that although PNP type transistors are shown, other switching means such as NPN transistors (or even electron-discharge devices) can be substituted therefor with the appropriate changes in the polarities of the operating and energizing potentials applied to such units.

A first coupling capacitor 30 is intercoupled between base 28*b* of transistor 28 and the junction of resistors 24 and 25. Another coupling capacitor 31 is coupled between base 29*b* and the junction of resistors 26 and 27 in the D.-C. clipping arrangement. A first emitter resistor 32 has one end thereof coupled to emitter or common electrode 28*e*, and a second emitter resistor 33 has one end thereof connected to emitter 29*e*. The other ends of these two resistors are coupled together, and this common connection is coupled over a dropping resistor 34 to line 35, in its turn connected to a terminal 36 to which a suitable unidirectional operating potential is applied. A biasing resistor 37 is coupled between base or input electrode 28*b* and common or ground line 38, and another biasing resistor 39 is coupled between base 29*b* and common line 38. Collector or output electrode 28*c* is coupled over a dropping resistor 40 to a supply line 41, in its turn coupled to terminal 42 to which a suitable unidirectional operating potential is applied. Another collector dropping resistor 43 is coupled between collector 29*c* and conductor 41.

Difference detector 19 includes a transistor 44, which in this embodiment is depicted as a PNP type transistor, having an input electrode or base 44*b*, an output electrode or emitter 44*e*, and a common electrode or collector 44*c*. A coupling capacitor 45 is intercoupled between base 44*b* and collector 29*c* of transistor 29. A diode 46 is interconnected as indicated between common line 38 and base 44*b*. Resistor 47 is intercoupled between collector 44*c* and supply line 41. Emitter 44*e* is coupled over resistor 48 and another resistor 49 to conductor 35. An output path from this emitter-follower stage 44 is provided from the junction of resistors 48 and 49 to base 50*b* of transistor 50 in the switching circuitry.

Emitter 50*e* is coupled to ground line 38, and collector 50*c* is coupled over a resistor 51 to supply line 41; this collector is also coupled over another resistor 52 to base 53*b* of another switching transistor 53. Collector 53*c* is coupled both to output terminal 21 and over a resistor 54 to supply line 41. Emitter 53*e* is coupled directly to ground line 38, and base 53*b* is coupled over a resistor 55 to line 35.

When a plurality of different channels are read or scanned with a reader utilizing the circuitry of the invention, an individual amplifier such as that shown in FIGURE 3 is provided for each separate channel. However all of the amplifier circuits can be energized from a single power supply such as that depicted in FIGURE 4. As there shown, a power supply is energized with a D.-C. potential having a polarity negative with respect to ground at terminal 57, and a voltage having a polarity positive with respect to ground at terminal 58. Terminal 59 is the ground or common connection for this circuit. A series circuit including resistors 60, 61 and 62 is intercoupled between terminals 57 and 58 to provide across resistor 61 the desired sensing semiconductor energizing potential. A filter capacitor 63 is connected across resistor 61 to assist in stabilizing the voltage across terminals 22 and 23. The other terminals designated 42, 36 and 56 are connected as indicated by like reference characters in FIGURE 3.

OPERATION OF THE INVENTION

As tape with unvarying brightness or unpunched areas is displaced past sensing phototransistor 16, the level of light incident on the phototransistor remains substantially unchanged, so that the conductivity of semiconductor 16 is substantially constant and the current flow through the circuit including resistors 24–27 and semiconductor 16 is substantially unchanged. Likewise there is constant conduction of transistors 28 and 29 in the difference amplifier, so that the potential appearing at collector 29c and applied to one side of capacitor 45 remains unchanged.

As a hole or blackened area is displaced past sensing semiconductor 16, the level of radiation sensed thereat is reduced, as indicated in FIGURE 1, decreasing the conductivity of the semiconductor and thus decreasing the current flow between terminals 22 and 23. The action of this circuit in producing the desired signal output over capacitors 30 and 31 to difference amplifier 18 will be explained in connection with FIGURE 5.

As there indicated, the phototransistor or semiconductor sensing means is depicted by a current generator 70 and an impedance 71, depicted as a resistor. One side of this parallel combination of elements is coupled through resistors 25 and 24 to a point of reference potential, designated 72; the polarity of this voltage is negative with respect to ground. The other common terminal of the parallel combination of current generator 70 and impedance 71 is coupled over resistors 26 and 27 to a terminal 73, to which a positive unidirectional energizing potential is applied. Between these terminals a pair of capacitors 74 and 75 are coupled in series, with the common connection between the capacitors coupled to ground at 76. This real ground connection produces a virtual ground 77 at a symmetrical position in the semiconductor sensing arrangement, provided that the circuit elements are sized properly.

A certain signal voltage will appear on each of the output conductors 78 and 79. Assuming initially that the level of light incident on the phototransistor is high, a high current is generated in unit 70 and is translated through each of resistors 24–27. With the current generator operating at a high level, at some point the IR drop across resistor 25 (which appears at output conductor 78) will reach a maximum value, being limited by the value of the supply voltage applied to point 72. Accordingly it is not until the level of current drops to such a value that the IR drop across resistor 25 decreases that an output signal variation appears on conductor 78.

As the current through resistors 25 and 24 decreases, the voltage drop across resistor 25 likewise decreases so that the potential at the junction of resistors 24 and 25 changes and approaches that appearing at terminal 72, that is, the potential at this junction becomes more negative. Such circuit operation is referenced in FIGURE 3 by the indication of the negative polarity sign to the left of capacitor 30. An analogous operation takes place in the lower portion of the circuit shown in FIGURE 5, resulting in the appearance of a voltage with the polarities indicated across the capacitor 31 in FIGURE 3. Accordingly, the negative-going voltage appearing between resistors 24 and 25 is applied through capacitor 30 to base 28b of transistor 28, concomitantly with the application of a positive-going voltage through capacitor 31 to base 29b of transistor 29.

Each of transistors 28 and 29 is, in the illustrated embodiment, of the PNP type. Accordingly the application of the negative-going voltage to base 28b effects an increase in the collector current of transistor 28, and the positive-going voltage applied to base 29b causes a rapid decrease in the collector current to transistor 29. With this sharp decrease in the collector current flowing through resistor 43 to supply line 41, the voltage across resistor 43 is rapidly reduced, with the voltage at the bottom of resistor 43 swiftly approaching the potential at terminal 42. In consequence, a negative-going pulse such as that referenced by numeral 80 is provided at the bottom of this resistor. As soon as the hole passes the scanning point, an opposite potential change occurs across capacitors 30 and 31, and normal circuit operation is restored to provide the trailing edge of pulse 80. This negative pulse is applied through coupling capacitor 45 to the common point between base 44b and diode 46 in the difference detector circuit.

Transistor 44 in difference detector circuit 19 is connected in an emitter-follower configuration. In this circuit, it is the potential appearing at the junction of resistors 48 and 49 which is applied to the base 50b of the first switching transistor 50, and such potential therefore determines the conductivity of that stage. When a negative-going pulse of sufficient amplitude is applied to PNP type transistor 50, the transistor will be gated on. The value of impedance between base 50b and the positive supply terminal 36 is set, being equal in the illustrated embodiment to the value of resistor 49. In the other direction from base 50b, three different components make up the total impedance value between the base and ground. These components include resistor 48, the emitter-base impedance of transistor 44, and the impedance exhibited by diode 46. These parameters are chosen so that to effect a sufficient change in the circuit values to cause transistor 50 to conduct, pulse 80 must signify a variation of input signal amplitude at least equal to that indicated by interval 15 in FIGURE 1. It is this combination of difference detection and effective D.-C. clipping in the initial portion of the system that contributes substantially to the success of the invention.

It is noted that diode 46 also provides for D.-C. clamping after the signal has passed through coupling capacitor 45, and that the emitter-follower configuration of transistor 44 contributes to a power gain of the signal. In the absence of receipt of any hole or dark tape signals, transistor 50 is non-conducting and transistor 53 is conducting. Accordingly when a control signal 80 representing a variation greater than the interval 15 in FIGURE 1 is applied over capacitor 45 to this difference detection circuit, the negative pulse applied to base 50b gates this transistor on and increases the flow of collector current through resistor 51 to supply line 41. Thus the potential appearing at the junction of resistors 51 and 52 changes in a positive direction, and a more positive voltage is applied to base 53b to switch this transistor off, providing a negative-going signal at output terminal 21. Those skilled in the art will recognize that a useable signal is provided at the output side of the difference detector (e.g., the junction of resistors 48 and 49), and that the use of switching transistors 50 and 53 does not affect the inventive concept and structure.

SUMMARY

The present invention provides an accurate and sure detector and amplifier system for use with a photoelectric scanner, or other signal discrimination circuitry. In particular, the separate considerations of temperature stability, D.-C. stability and good gain characteristics have all been realized in the structure disclosed and claimed hereinafter. These improved operating characteristics have been realized with inexpensive components, such as germanium transistors rather than the more expensive silicon types. With the accurate and economical circuitry here disclosed, it is possible to provide an efficient photoelectric reader without individual light channels or light pipes and without the rotating disc.

Figure 4:
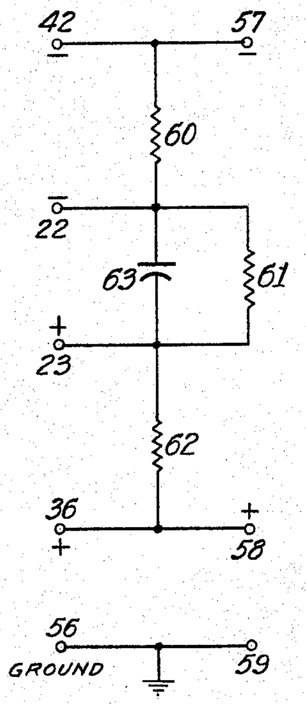
FIGURE 4 is a schematic diagram of a power supply arrangement utilized to supply a plurality of circuit arrangements such as that shown in FIGURE 3.

To facilitate the construction and use of the invention, a table of suitable component identifications and values of the various elements shown in FIGURES 3 and 4 is set out below. It is emphasized, however, that such a table is given by way of illustration only and in no sense by way of limitation of the inventive scope.

| Component | Identification |
|---|---|
| Phototransistor 16 | 1N2175 |
| Transistor 28 | 2N508 |
| Transistor 29 | 2N508 |
| Diode 46 | 1N279 |
| Transistor 44 | 2N508 |
| Transistor 50 | 2N404 |
| Transistor 53 | 2N404 |

| Resistors: | Value in ohms |
|---|---|
| 24 | 100K |
| 25 | 270K |
| 26 | 270K |
| 27 | 100K |
| 32 | 470 |
| 33 | 470 |
| 34 | 22K |
| 37 | 33K |
| 39 | 33K |
| 40 | 22K |
| 43 | 22K |
| 47 | 1.5K |
| 48 | 47 |
| 49 | 2.2K |
| 51 | 2.2K |
| 52 | 4.3K |
| 54 | 1K |
| 55 | 56K |
| 60 | 2.2K |
| 61 | 4.7K |
| 62 | 2.2K |

| Capacitors: | Values in microfarads |
|---|---|
| 30 | 1 (25 v. D.C.) |
| 31 | 1 (25 v. D.C.) |
| 45 | 5 (25 v. D.C.) |
| 63 | 50 (50 v. D.C.) |

In addition, a negative 12 volts energizing potential was applied to terminal 57 in FIGURE 4, and a positive twelve volts potential was applied to terminal 58, each being referenced with respect to the common or ground terminal 59.

It is noted that resistors 25 and 26 were selected to be substantially larger in ohmic value (more than twice as large) than resistors 24 and 27. Such sizing contributes to the isolation and noise immunity of the invention, especially to environmental noise such as is generated by the drive motor of the system.

While only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. In a signal examining and indicating system for receiving input signals varying from a reference value to a second value to indicate information content, said input signals being subject to undesired aberrations and also to environmental noise occurring above a given amplitude level, the improvement which comprises clipping circuit means including a photosensitive semiconductor means, first impedance means coupled between said semiconductor means and a first plane of reference potential, second impendance means coupled between said semiconductor means and a second plane of reference potential, current flow through the series circuit including said semiconductor means and said first and second impedance means varying as a function of the level of the radiation incident on said semiconductor means, circuit means for obtaining a control signal from said series circuit only responsive to a variation in the radiation level indicating receipt of an input signal varying below said given amplitude level, and a difference detector circuit coupled to said circuit means to provide an output signal only responsive to a determination that the control signal in fact indicates a variation between said reference and said second values of the input signal.

2. In a signal examining and indicating system for receiving input signals varying between a reference level and a second level to denote information content, certain of said input signals being subject to an undesired aberration in the reference level signal which occurs above a given amplitude level and said system further being subject to environmental and other noise also occurring above said given amplitude level, the improvement which comprises a clipping circuit comprising a series circuit coupled between two different planes of supply potential, said series circuit comprising a first impedance, a second impedance, a photosensitive semiconductor unit, a third impedance, and a fourth impedance, said clipping circuit passing a control signal responsive to a variation of said input signal below said given amplitude level, a difference amplifier including at least two input connections and one output connection, means for coupling the junction of said first and second impedances to one input connection of said difference amplifier, means for coupling the junction of said third and fourth impedances to the other of said input connections of said difference amplifier, a difference detector circuit for receiving the control signal from the difference amplifier whenever the variation of input signal indicates receipt of an input signal with a variation of information content, and means for coupling said output connection of the difference amplifier with said difference detector circuit to provide a positive indication of receipt of information-denoting signals in said system.

3. A system as set out in claim 2 in which said second and third impedances are substantially larger in value than said first and fourth impedances, thereby to improve the immunity to noise of the clipping circuit.

4. In a signal indicating system for receiving input signals varying between reference and second levels to depict information content, said system being subject to random noise and to aberrations in the reference level of different information-denoting signals, all of said random noise and level aberrations occurring above a given amplitude level of the input signals, the improvement which comprises a clipping circuit for receiving the input signals, said clipping circuit comprising photosensitive semiconductor means and being adjustable to operate in a saturated condition at said given amplitude level whenever signals of said reference level, undesired aberrations at approximately said reference level, and unwanted noise are received by the system and to operate at a second amplitude lower than said given amplitude level only responsive to an amplitude variation in an input signal below said given amplitude level, and a difference detector circuit coupled to said clipping circuit for providing an output signal only responsive to receipt of a control signal representing a decrease in the amplitude of the signal from said clipping circuit by a preassigned amount, said difference detector means including semiconductor means in the circuit which determines conductivity of this circuit, which semiconductor means changes impedance as the control signal is received to insure fast action of the difference detector circuit and a positive indication of the output signal.

5. In a system for both rejecting noise and unwanted signal aberrations which occur above a given amplitude level and for passing information-denoting signals which vary from a reference level to a second level below said given amplitude level, a clipping circuit calibrated to provide no signal output whenever the level of the input signal is above said given amplitude level and to provide a control signal output whenever the amplitude of said input signal varies below said given amplitude level, and a difference detector circuit coupled to said clipping circuit, said difference detector circuit comprising an input connection coupled to said clipping circuit and an output connection, a first semiconductor having input, output and common electrodes, a second semiconductor, means for coupling said input connection both to the input electrode of said first semiconductor means and to said second semiconductor, and means for intercoupling said output electrode with the output connection of the difference detector circuit, whereby application of a control signal from said clipping circuit to the input electrode of said first semiconductor effects rapid switching of the difference detector circuit from a first state to a second state to provide an output signal indicating a change of information in said input signal.

6. In a photoelectric reading arrangement for removing information from a plurality of different types of tapes having different background levels, the improvement which comprises an input clipping circuit comprising photosensitive semiconductor means and impedance means intercoupled to establish a clipping level such that no control signal is provided whenever the input signal to the clipping circuit is above a given amplitude level and to provide a control signal only when an information-denoting mark on the tape passes the scanning point and reduces the amplitude of the input signal to the clipping circuit below said given amplitude level, a difference amplifier coupled to said clipping circuit for enhancing the amplitude of the control signal, a difference detector circuit coupled to said difference amplifier for providing an output signal only responsive to the receipt of a control signal of preassigned amplitude from said difference amplifier, and switching means coupled to said difference detector circuit to amplify the output signal for translation to associated equipment.

7. In a photoelectric tape reader for transferring information from any of a plurality of different types of tape, each different type of tape being related to a given average electrical signal when no hole appears on the tape, said signal decreasing to a hole-denoting minimum value as a hole on the tape moves past the scanning location, an input clipping circuit comprising photosensitive semiconductor means and a plurality of impedance means coupled to the semiconductor means, said clipping circuit being operative at a clipping level above the maximum level of the various hole-denoting minimum values for the different types of tape so that the worst hole signal is accommodated and a control signal is provided by the clipping circuit when a hole on the tape passes the scanning location, a difference amplifier coupled to the clipping circuit for increasing the amplitude of such control signal, a difference detector circuit coupled to the difference amplifier for accommodating the worst difference signal by providing an output signal only when the amplified control signal exceeds as preassigned amplitude, and means coupled to the difference detector circuit to pass the output signal to associated equipment.

References Cited by the Examiner

UNITED STATES PATENTS

| | | | |
|---|---|---|---|
| 2,507,743 | 5/1950 | Victoreen | 250—219 |
| 2,657,258 | 10/1953 | Hestor | 250—206 X |
| 2,825,818 | 3/1958 | Richardson | 250—214 X |
| 2,941,083 | 6/1960 | Henderson et al. | 250—206 |
| 3,001,077 | 9/1961 | Van Overbeck et al. | 250—214 X |
| 3,058,004 | 10/1962 | Domizi et al. | 250—219 |
| 3,061,731 | 10/1962 | Thier et al. | 250—219 |
| 3,135,867 | 6/1964 | Daneff | 250—214 X |
| 3,163,746 | 12/1964 | Hoeser | 250—219 |

FOREIGN PATENTS

| | | |
|---|---|---|
| 230,965 | 10/1960 | Australia. |

RALPH G. NILSON, *Primary Examiner.*

E. STRICKLAND, M. A. LEAVITT, *Assistant Examiners.*